United States Patent [19]

Sudo et al.

[11] 4,104,692

[45] Aug. 1, 1978

[54] DEVICE FOR DETECTING ABNORMAL TEMPERATURE IN FIXER

[75] Inventors: Katsumi Sudo; Yukio Kanazawa, both of Ebina, Japan

[73] Assignee: Rank Xerox, Ltd., London, England

[21] Appl. No.: 756,522

[22] Filed: Jan. 3, 1977

[30] Foreign Application Priority Data

Jan. 19, 1976 [JP] Japan .................. 51-004717

[51] Int. Cl.² .............................................. H02H 5/04
[52] U.S. Cl. .................................. 361/106; 219/216; 361/165; 361/182
[58] Field of Search ............... 219/216; 361/103, 106, 361/182, 197, 165, 162; 307/233 R, 271

[56] References Cited

U.S. PATENT DOCUMENTS 4,034,189  7/1977  Sakamaki et al. ................. 219/216

Primary Examiner—Harry E. Moose, Jr.

[57] ABSTRACT

A device for detecting an abnormal temperature in a fixer, including a pulse generation controller capable of detecting the temperature in the fixer, comparing it with a predetermined reference temperature, and generating pulses continuously while the fixer temperature is lower than the reference temperature or generating no pulse at any other time; a pulse interrupter for interrupting the pulse output from the pulse generation controller until the temperature in the fixer reaches a desired fixing temperature for the first time after the start of power supply to the fixer, and an abnormality detector for detecting an abnormal fixing temperature when the integral of the pulses having passed through the pulse interrupter within a given time has reached a predetermined value.

2 Claims, 4 Drawing Figures

DEVICE FOR DETECTING ABNORMAL TEMPERATURE IN FIXER

BACKGROUND OF THE INVENTION

The present invention relates to a fixer for thermally fixing a copy sheet or the like, and more particularly to an abnormal temperature detector adapted for detecting overheat caused by an abnormal state in the heat control of such a fixer.

For thermal fixing of a copy sheet onto which a toner image is transferred in a copying machine two thin plate-shaped heating elements of large surface area are disposed in parallel with each other. The copy sheet is passed through the space between the elements while heating the elements electrically. A similar method uses upper and lower bar-shaped heating elements in parallel with each other between which the copy sheet is passed.

In the fixer where such methods are used, it is desirable to maintain the temperature in the fixer within a range optimal for fixing the toner transferred onto the copy sheet. For this purpose, a temperature controller equipped with a temperature detector such as C-A thermocouple is provided directly on or in the vicinity of the heating element in the fixer so as to maintain the fixer temperature at the optimal point.

In such a fixer, when any deterioration or breakdown occurs in the temperature controller, or when the temperature detector attached directly to the heating element receives electric noise from any other component of the copying machine, or when the temperature detector welded directly to the heating element is separated partially or entirely from the surface of the heating element, then normal control is not attainable with respect to the electric power supplied to the heating element of the fixer. Consequently, power supply to the heating element is rendered excessive to cause a burning phenomenon of the copy sheet such as blackening or combustion in case the copy sheet is jammed in the fixer.

The object of the present invention is to provide an abnormal temperature detector which is capable of detecting abnormal heating in a fixer in its early stage so as to prevent the above-described problem.

DESCRIPTION OF THE PREFERRED EMBODIMENT

Figure 1:
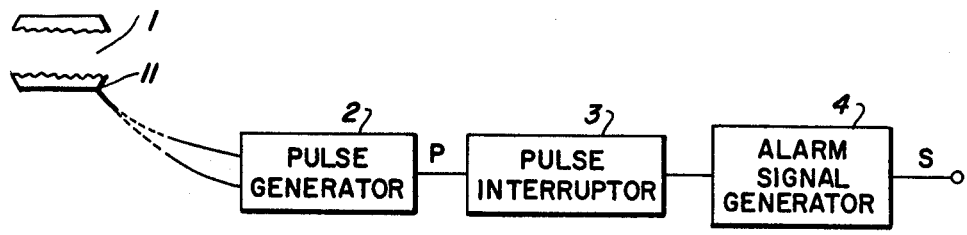
Figure 2:
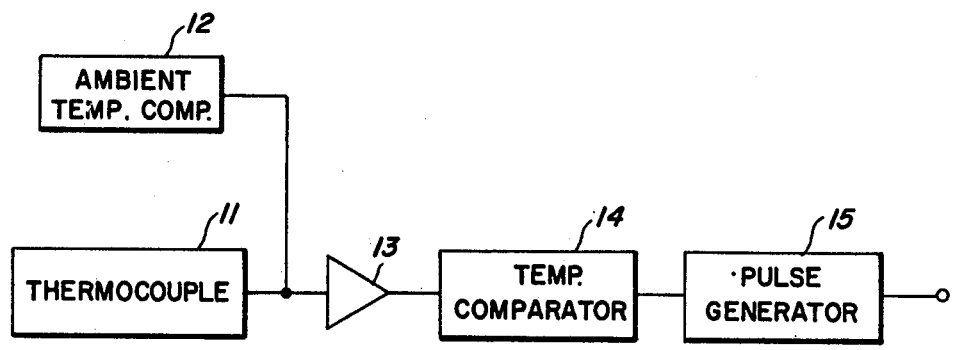

As plotted in the block diagram of FIG. 1, the abnormal temperature detecting device of the present invention consists of a pulse generation controller 2 for controlling generation of pulses in accordance with the temperature in a fixer 1, a pulse interrupter 3 for interrupting the transmission of generated pulses until the temperature in the fixer 1 reaches a desired fixing temperature for the first time after the start of power supply to the fixer, and an abnormality detector 4 for producing an abnormality signal S by detecting an abnormal state in temperature control when the integral of the pulses having passed through the pulse interrupter 3 within a given time has exceeded a numerical value in the normal fixing temperature control.

Hereinafter the present invention will be described with reference to an exemplary embodiment.

When heating electric power is supplied to a heating element in a fixer 1, the temperature in the fixer rises up to a fixing temperature (approximately 360° C on the heating element of the fixer). The temperature in the fixer is detected by means of a C-A thermocouple 11 welded directly to the heating element, and the detection signal thus obtained is compensated by the output of an abient-temperature compensator 12 in accordance with the ambient temperature in the copying machine. Subsequently, the signal is amplified in an amplifier 13 and then is applied to a temperature comparator 14 which is a circuit for comparing the output of amplifier 13 with a reference signal corresponding to a predetermined reference temperature (in this case, approximately 360° C equal to the fixing temperature). During the period prior to attainment of the fixer temperature to the reference temperature, this circuit sends out a signal to a pulse generator 15 so as to effect generation of pulses. Thus, the pulse generator functions to generate continuous pulses Pa of FIG. 3 until the fixer temperature reaches the fixing temperature (during the period labeled as A in FIG. 3) after the start of heating power supply to the fixer 1. Once the fixing temperature is attained, continuous pulses Pb are generated during the period (labeled as B in FIG. 3) in which the fixer temperature is below the reference temperature. And when the temperature in the fixer 1 is above the reference temperature, pulse generation is brought to a stop.

Figure 3:
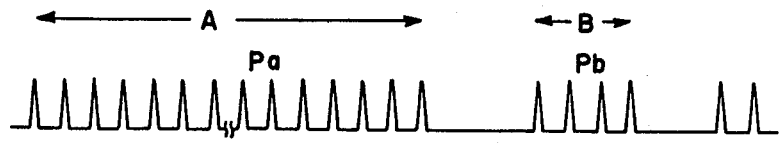
Figure 4:
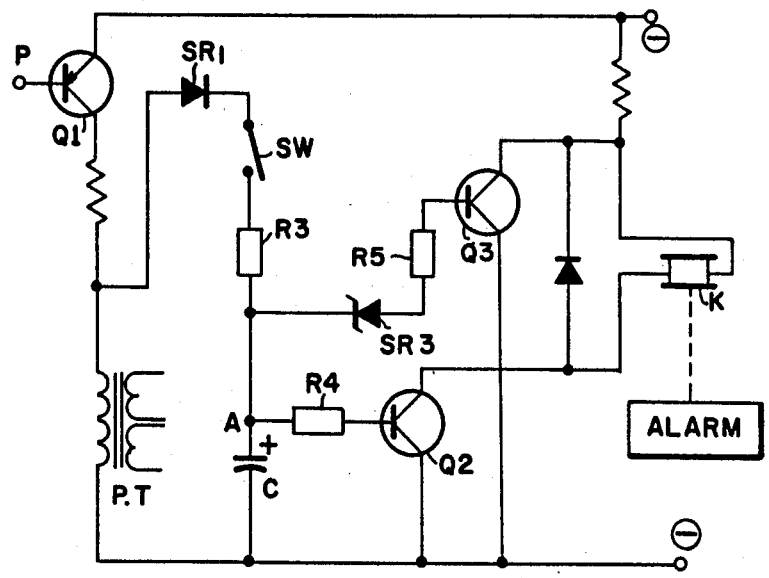

The pulses Pa and Pb of FIG. 3 thus generated under control of pulse generation controller 2 are applied to the base of a transistor Q1 shown in FIG. 4. Upon arrival of continuous pulses at the base of transistor Q1, it is turned on so that its collector potential becomes equivalent to the emitter potential, thereby applying a pulsating voltage to the primary winding of a pulse transformer PT. Therefore, while continuous pulses are being applied to the base of transistor Q1, a voltage is induced on the secondary side of pulse transformer PT to supply a.c. power to the heating element of fixer 1 through an unshown thyristor conversion circuit.

In the meanwhile, the pulse signal is applied to a capacitor C.

Accordingly, while the pulses Pa are generated continuously in the period A of FIG. 3 after the start of power supply for heating the fixer, the switch SW functions to interrupt transmission of the pulses to the capacitor C, but once the temperature in the fixer 1 has risen up to the fixing temperature, the switch SW is closed to permit transmission of the pulses Pb to the capacitor C. When the capacitor is charged, the base potential of transistor Q2 is increased and the charging current is partially discharged through transistor Q2 to turn it on, thereby exciting a relay K. The resistor R3 serves to divide the pulse voltage applied to the capacitor C, in cooperation with a resistor R4.

Excitation of the relay K is used for indicating that the fixer is not in an abnormal state where fixing is impossible.

When the fixer is in a normal heating state, the frequency of generation of pulses Pb obtained from the pulse generator 15, that is, the number of pulses generated per unit time, never exceeds a predetermined number, and the potential of capacitor C is maintained within a predetermined value, so that the transistor Q2 is kept turned on to hold the relay K in the excited position. During this period, the transistor Q3 is kept turned off.

However, when the number of pulses per unit time increases for some reason to exceed the predetermined value, that is, when the integral of pulses within a given time becomes greater, then the balance between the discharge to transistor Q2 and the charge to capacitor C is lost to cause a gradual rise of the potential of capacitor C. As the integral of pulses comes to be greater than the given value in this manner, a current flows into the base of transistor Q3 through a zener diode SR3 and a current control resistor R5.

In such a state, the transistor Q3 is turned on to render the relay K at the equal potential, so that the relay is released.

This state occurs in the case where generation of the pulse signal continues for more than the time required for normal temperature control of the fixer. Namely, there exists in this state the possibility of causing a fault in the temperature controller to result in overheating of the fixer. It follows accordingly that release of the relay K indicates an abnormal state in the fixer. Therefore, release of the relay K once excited after the start of power supply is usable for interrupting the power supply to the fixer 1 and also for stopping the operation of the copying machine.

Thus, differing from a conventional device which detects an abnormal temperature merely after occurence of overheated condition caused by some reason in the fixer, the present invention is capable of detecting the process to such overheated condition in the initial state, thereby making it possible to take a proper protective means prior to blackening or ignition of a copy sheet being fixed.

In the foregoing description, control of power supply to the heating element of the fixer is performed by using the output pulses of pulse generator 15. However, the power control means for the heating element is not related to the present invention, and it is of course permitted to employ any other means for effecting such control.

What is claimed is:

1. A device for detecting an abnormal temperature in a fixer, including a pulse generation controller capable of detecting the temperature in the fixer, comparing it with a predetermined reference temperature, and generating pulses continuously during the time period that the fixer temperature is lower than the reference temperature; a pulse interrupter for interrupting the pulse output from the pulse generation controller until the temperature in the fixer reaches a desired fixing temperature for the first time after the start of power supply to the fixer, and an abnormality detector for detecting an abnormal fixing temperature when the integral of the pulses having passed through the pulse interrupter within a given time has reached a predetermined value.

2. The combination recited in claim 1 wherein said abnormality detector includes a capacitor coupled to said pulse controller, a first electronic switch coupled to said capacitor, said first switch maintained in a closed condition when said capacitor is charged to a preselected voltage, and an indicating relay for indicating the normal condition when said first switch is in said closed condition, a second electronic switch coupled in parallel across said relay and normally biased to an open circuit condition by said capacitor, but responsive to the rise in voltage on said capacitor above said preselected value to switch to its closed circuit condition for inactivating said relay to indicate said abnormal condition.

* * * * *